(12) United States Patent
Kimura et al.

(10) Patent No.: US 6,496,451 B2
(45) Date of Patent: Dec. 17, 2002

(54) OBJECTIVE LENS DRIVING DEVICE AND OPTICAL DISC APPARATUS

(75) Inventors: Katsuhiko Kimura, Chiyoda (JP);
Mitsuo Satake, Yokohama (JP);
Masayoshi Watanabe, Yokohama (JP);
Tetsuo Ito, Yokohama (JP)

(73) Assignees: Hitachi, Ltd., Tokyo (JP); Hitachi Media Electronics Co., Ltd., Mizusawa (JP)

( * ) Notice: Subject to any disclaimer, the term of this patent is extended or adjusted under 35 U.S.C. 154(b) by 0 days.

(21) Appl. No.: 09/784,122

(22) Filed: Feb. 16, 2001

(65) Prior Publication Data

US 2002/0071376 A1 Jun. 13, 2002

(30) Foreign Application Priority Data

Oct. 27, 2000 (JP) .................................. 2000-333524

(51) Int. Cl.$^7$ ................................................ G11B 7/00
(52) U.S. Cl. .............. 369/44.14; 369/4.15; 369/112.23; 359/813; 359/823
(58) Field of Search ........................... 369/44.11, 44.14, 369/44.15, 44.16, 44.22, 44.32, 112.01, 112.08, 112.23; 359/813, 814, 824, 823

(56) References Cited

U.S. PATENT DOCUMENTS 5,046,820 A * 9/1991 Saekusa et al. .......... 369/44.15
6,342,978 B1 * 1/2002 Nishikawa et al. ...... 369/44.15

* cited by examiner

*Primary Examiner*—Muhammad Edun
(74) *Attorney, Agent, or Firm*—Antonelli, Terry, Stout & Kraus, LLP

(57) ABSTRACT

To provide an objective lens driving device that drives an objective lens for converging light on a recording surface of an optical disk, not only in a focusing and a tracking directions but also in an inclining direction of an optical axis of the objective lens, four support members are fixed to outer edge portions of a lens holder, and positions where the other support members are fixed to at least one of the lens holder and a fixing section are located inside the four support members fixed to the outer edge portions of the lens holder.

15 Claims, 9 Drawing Sheets

OBJECTIVE LENS DRIVING DEVICE AND OPTICAL DISC APPARATUS

BACKGROUND OF THE INVENTION

The present invention relates to an optical disk apparatus, and in particular, to an optical disk apparatus comprising an objective lens driving device for driving an objective lens converging light on a recording surface, in a focusing direction, a tracking direction, and an inclining direction of an optical axis of the objective lens.

To achieve appropriate recording and reproduction in optical disk apparatuses, in which the recording density is continuously improved, objective lens driving devices are required which drive an objective lens converging light on a recording surface of the optical disk apparatus, not only in a focusing and a tracking directions but also in an inclining direction of an optical axis of the objective lens, thereby correcting even the inclination of an optical disk. Such an objective lens driving device is disclosed in, for example, in JP-A-6-162540 specification or JP-A-10-275354 specification.

In JP-A-6-162540 specification, a support member for supporting an objective lens holder for free inclined movement is shaped like eight parallel straight lines having one end secured to a side surface of the objective lens holder and the other end secured to a supporting and fixing section of a base, and supports a movable portion for free movement and inclined movement in three directions: the focus direction, the tracking direction, and the inclining direction.

In JP-A-10-275354 specification, there are provided an objective lens and a pair of support members for supporting the objective lens and the pair of support members are disposed in a plane orthogonal to the optical axis of the objective lens. The pair of support members each have one end connected to the objective lens and the other end connected to a fixed portion. And, with respect to rigidity indicating how difficult it is for the objective lens to rotate around the direction orthogonal both to the optical axis and a longitudinal direction of the support member, the one end side of the pair of support members is less rigid than the other end side thereof.

In the optical disk apparatus, to promptly and accurately align, light converged by the objective lens in the focusing direction, the tracking direction, and the inclining direction of the optical axis of the objective lens, by consuming only a small amount of power, the operational sensitivity of the objective lens driving device in each direction must be improved so that when the device is operated in a predetermined direction, a cross action corresponding to movement in another direction is reduced.

When M denotes a moment that acts around the center of the support members supporting the movable portion including the objective lens, on the fixing section when a drive voltage V is applied, Ki denotes a spring constant of each support member, and Li denotes a distance from the center of the support members to the fixing position of each support member, a static operational sensitivity St in the inclining direction of the optical axis of the objective lens is expressed by:

where the subscript i denotes the order of one of the plurality of support members. This equation indicates that to improve the operational sensitivity in the inclining direction, the moment acting around the center of the support members must not only be increased, but the spring constant of the support members must be reduced, and the distance from the center of the support members to the fixing position of each support member must also be reduced.

In the above mentioned JP-A-6-162540 specification, however, the eight linear support members are secured to the side surfaces of the lens holder and the distance from the center of the support members to the fixing position of each support member is large, so that this device does not have a sufficiently improved operational sensitivity.

On the other hand, in the above mentioned JP-A-10-275354 specification, a pair of support members are used wherein one end side thereof is made less rigid than the other end side thereof to obtain an operational sensitivity in the inclining direction. With this configuration, however, the rigidity also decreases in the focusing direction and the tracking direction, and cross action is likely to occur when the center of the support members deviates even slightly from the center of the action of a driving force.

OBJECT AND SUMMARY OF THE INVENTION

The present invention is achieved in view of these points, and it is an object thereof to provide an objective lens driving device that improves operational sensitivity and reduces cross action in the case when light converged by an objective lens is driven and controlled to propagate in a focusing direction, a tracking direction, and a inclining direction of an optical axis of the objective lens.

To attain this object, the present invention provides an objective lens driving device including: an objective lens for converging light on a recording surface of an optical disk; a lens holder for holding the objective lens; and a plurality of support members for supporting a movable portion including the lens holder in such a manner that the movable portion can operate relative to a fixing section in a focusing direction, a tracking direction, and an inclining direction of an optical axis of the objective lens, in which four of the plurality of support members are fixed to outer edge portions of the lens holder, and at least one of the positions where the other support members are fixed to one of the lens holder or a fixing position of the fixing section is located inside the four support members fixed to the outer edge portions of the lens holder. The four support members fixed to the outer edge portions of the lens holder can restrain cross action, which may occur during an operation in each direction, while the other support members disposed for the inclining operation are fixed inside the four support members fixed to the outer edge portions of the lens holder, thereby reducing the distance from the center of the support members and improving the operational sensitivity in the inclining direction.

Additionally, according to the present invention, the support members fixed inside the four support members fixed to the outer edge portions of the lens holder can each have a coil-shaped portion or two or more bent portions or two or more coil-shaped bent portions to reduce the spring constant of the support members and improve the operational sensitivity in the inclining direction.

The above configuration serves to reduce cross section and improve the operational sensitivity in the inclining direction, thereby enabling the objective lens driving device and the optical disk apparatus to be stably driven and controlled.

DESCRIPTION OF THE EMBODIMENTS

One embodiment of the present invention will be described below with reference to the drawings.

Figure 7:
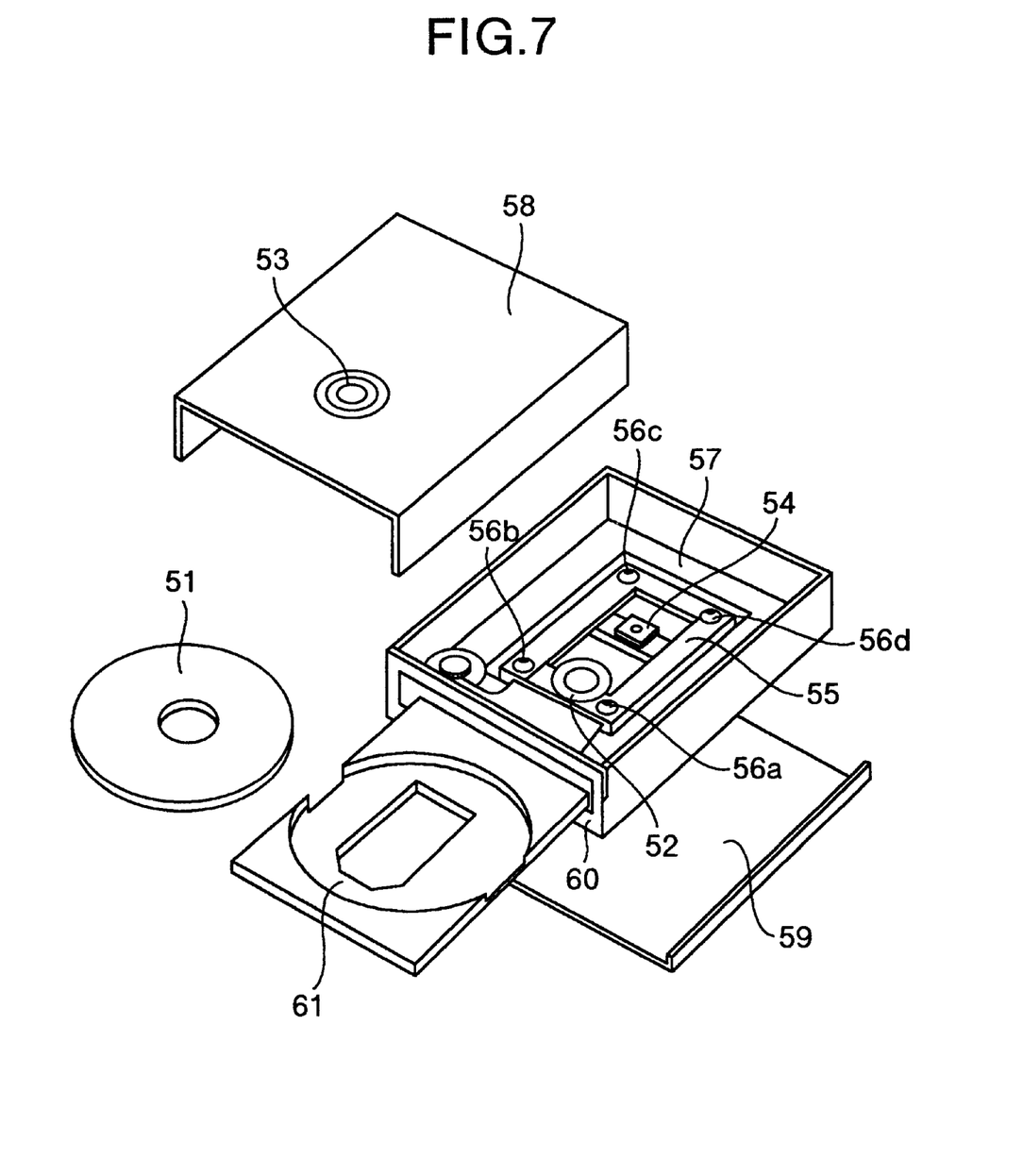
FIG. 7 is a view showing an optical disk apparatus to which the objective lens driving device of the present invention is applied.

FIG. 7 is a perspective view showing an optical disk apparatus to which the present invention is applied.

A disk apparatus comprises a disk loading mechanism that conveys a disk 51 that is a disk-shaped information recording medium, into the device, subsequently mounts the disk 51 on a turntable provided around a rotating shaft of a spindle motor 52, and then fixes the disk 51. This disk loading mechanism comprises a disk tray 61, a loading motor which is not shown, a gear for transmitting a driving force of the motor, and a disk damper 53 for fixing the driving force transmitting member and the disk 51 to the turntable of the spindle motor 52.

A disk loading operation includes an operation of moving the disk tray 61, on which the disk 51 is placed during conveyance, into and out from a loading and unloading slit formed in a front panel 60 of the apparatus, in order to load or unload the disk 51 in or from the apparatus. It further includes an operation of integrally elevating and lowering the spindle motor 52, an optical head 54 for reproducing information from the disk 51 or recording information thereon before reproducing it therefrom, and a unit mechanical chassis 55 for holding these components, in order to mount the disk 51 loaded in the apparatus, on the turntable of the spindle motor 52 and then fix it using the disk damper 53 provided on a surface of a top cover 58 which is opposite to the disk 51. When the disk 51 is fixed to the spindle motor 52, the spindle motor 52 rotates at a specified rotation speed to allow the optical head 54 provided in the unit mechanical chassis 55 to reproduce information recorded on the dick 51 or record information thereon.

The optical head 54 comprises drive means for moving a lens toward the disk 51 as well as drive means for moving the lens in a radial direction. Additionally, the unit mechanical chassis 55 has the spindle motor 52 and the optical head 54 attached thereto. Vibration or impact transmitted to the unit mechanism chassis from an exterior of the apparatus is dampened by insulators 56a, 56b, 56c, and 56d (elastic members). The unit mechanical chassis 55 is mounted on a unit holder which is not shown via the insulators 56a, 56b, 56c, and 56d. Further, the unit holder is fittingly coupled to a mechanical base portion 57. The mechanical base portion 57 has a circuit board mounted thereunder for controlling the spindle motor and others, and the circuit board has its outside covered with a bottom cover. The disk apparatus is configured so as to be integrated into a computer apparatus or the like with the bottom cover 59 and the top cover 58 mounted thereon.

Figure 1:
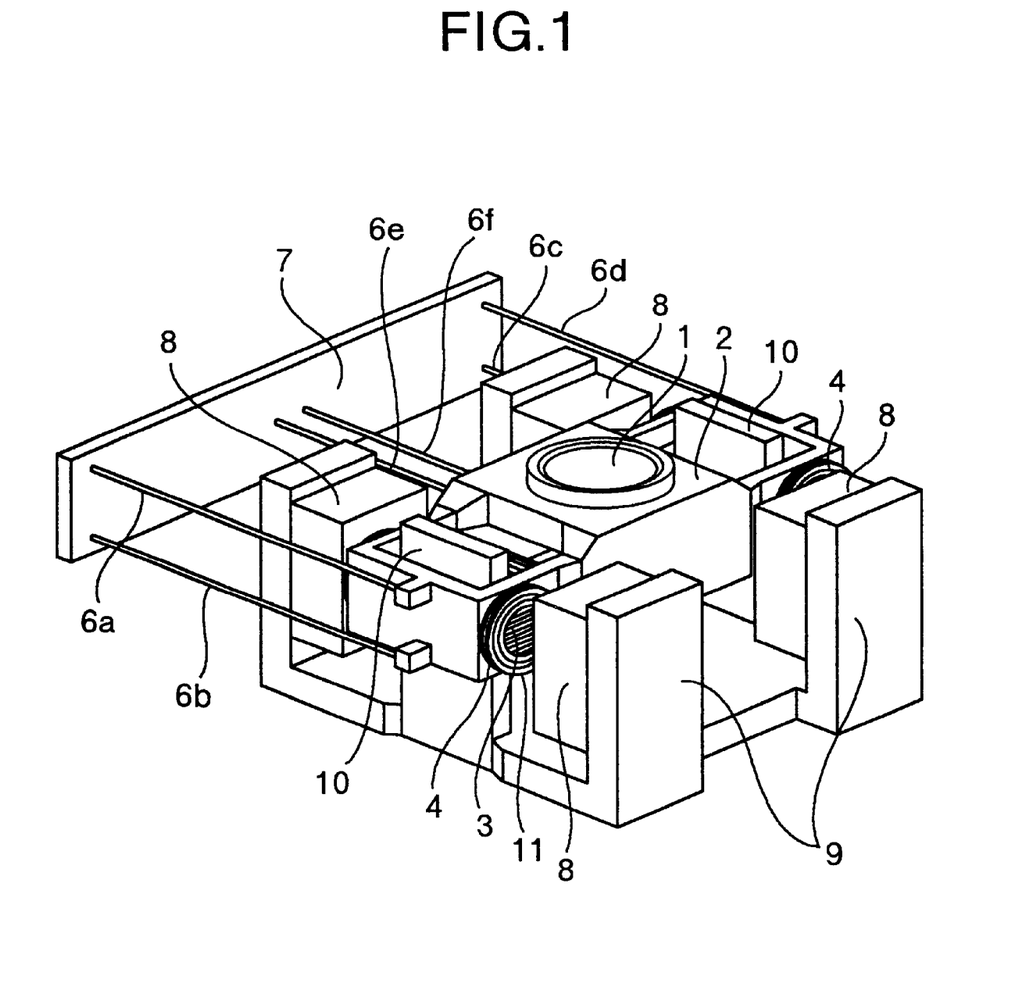
FIG. 1 is a view showing an embodiment of an objective lens driving device of the present invention.

FIG. 1 is a perspective view showing a configuration of one embodiment of an objective lens driving device corresponding to the optical head 54 section of the present invention.

A lens holder 2 for holding an objective lens 1 has two focusing coils 3, four tracking coils 4, and two inclining-operation coils 11 all attached thereto. The focusing coils 3 and the inclining-operation coils 11 for the inclining operation are arranged on one another in a vertical direction. In this embodiment, the focusing coils 3 are shown above, while the inclining-operation coils 11 are shown below, but these coils may be arranged in the reverse positions. The objective lens 1, the lens holder 2, the focusing coils 3, the tracking coils 4, and the inclining-operation coils 11 constitute a movable portion 5. Four support members 6a, 6b, 6c, and 6d have one end fixed to an outer edge portion of the lens holder 2 and the other end fixed to a fixing section 7 in such a manner that the support members extend in substantially parallel. Two support members 6e and 6f are arranged inside the four support members 6a, 6b, 6c, and 6d (closer to the center of a plane enclosed by the four support members) fixed to the outer edge portion of the lens holder 2. These support members have one end fixed to the lens holder 2 and the other end fixed to the fixing section 7 in order to support the movable portion 5 relative to the fixing section 7. Permanent magnets 8 are located opposite each other in such a fashion sandwiching the focusing coils 3, tracking coils 4, and inclining-operation coils 11 located at opposite sides of the objective lens 1, and are each secured to a yoke 9 composed of a magnetic substance. The yokes 9 have an inner yoke 10 extended from their bottom surface so as to be located inside the focusing coils 3 and the inclining-operation coils 11.

Figure 2:
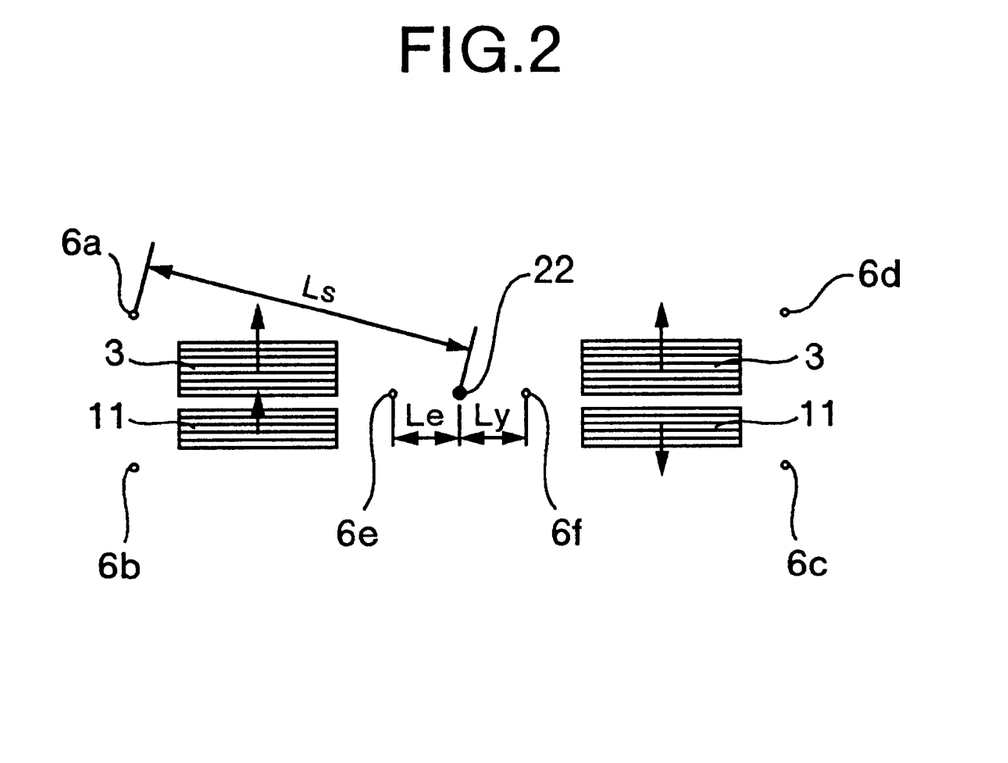
FIG. 2 is a view showing an operation of the objective lens driving device of the present invention.

FIG. 2 shows the focusing coils 3, the inclining-operation coils 11, and the support members 6a, 6b, 6c, 6d, 6e, and 6f as seen from the front. As shown in FIG. 2, a drive current is applied to the two focusing coils 3 so that electromagnetic forces generated due to interaction between the coils and magnetic fluxes from the permanent magnets 8 act in the same direction, thereby driving the movable portion 5 in a focusing direction corresponding to the direction of an optical axis of the objective lens 1. In addition, a drive current is applied to the two inclining-operation coils 11 so that electromagnetic forces generated due to interaction between the coils and magnetic fluxes from the permanent magnets 8 act in the opposite directions, thereby rotationally driving the movable portion 5 around the center 22 of the support members. Further, although not shown, a drive current is applied to the four tracking coils 4 so that electromagnetic forces generated due to interaction between the coils and magnetic fluxes from the permanent magnets 8 act in the same direction, thereby driving the movable portion 5 in a tracking direction corresponding to the radial direction of the optical disk.

As described above, cross action between the focusing direction and the tracking direction and the inclining-operation direction can be restrained by fixing the four support members 6a, 6b, 6c, and 6d to the outer edge portion of the lens holder 2. Even if the support members 6e and 6f for the inclining operation are also disposed, since they have a smaller distance from the inclining center than the four support members 6a, 6b, 6c, and 6d, operational sensitivity in the inclining direction can be obtained. As described above, the distance from the center of the support members to each support member is inversely proportional to the square of the operational sensitivity in the inclining direction, so that when the support members 6e and 6f are disposed closer to the center of the plane enclosed by the four support members, an increase in rigidity in connection with the operation in the inclining direction is minimized. The objective lens driving device can thus restrain cross action in each of the focusing direction, tracking direction, and inclining-operation direction and has an improved operational sensitivity.

Figure 3:
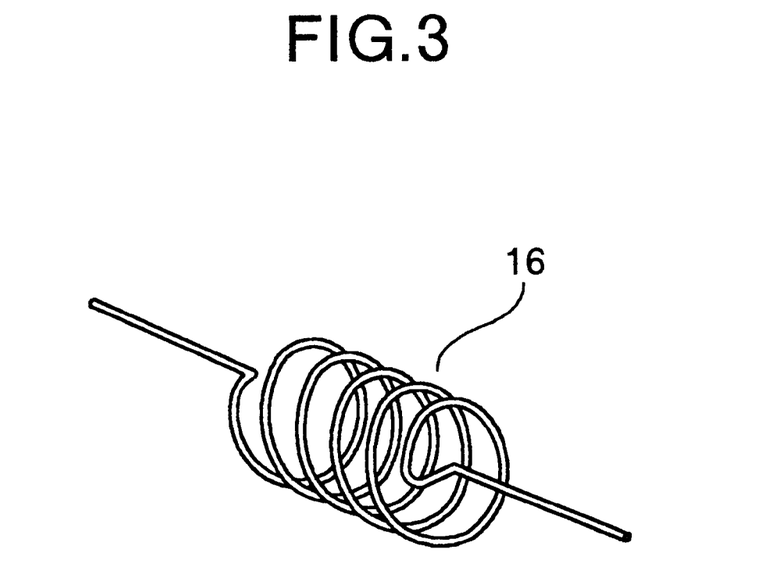
FIG. 3 is a view showing another embodiment of the present invention.

Next, FIG. 3 shows the shapes of support members in another embodiment of the present invention. A support member 16, shown in FIG. 3, comprises the support member 6e or 6f in the first embodiment which is shaped to have a coil-shaped portion in the middle thereof. When a Young's modulus for a material is denoted by E, a Poisson's ratio is denoted by y, a wire diameter is denoted by d, the number of coil turns is denoted by n, a coil diameter is denoted by D, and an overall length is denoted by a, a spring constant Kc of the coil-shaped portion is expressed by:

In addition, the spring constant Ks of a straight rod is expressed by:

When, for example, the number of coil turns is five, the coil diameter D is 1 mm, the overall length a is 10 mm, and the Poisson's ratio γ is 0.3, the spring constant Kc of the coil-shaped portion is half that Ks of a straight rod. As described previously, the spring constant of the support members is inversely proportional to the operational sensitivity in the inclining direction, so that the coil-shaped portion formed in the middle of the support member 16 serves to reduce the spring constant of the support member 16 to thereby improve the operational sensitivity in the inclining direction. If the support member is shaped like a coil all over its length, the spring constant can further be reduced.

Figure 4:
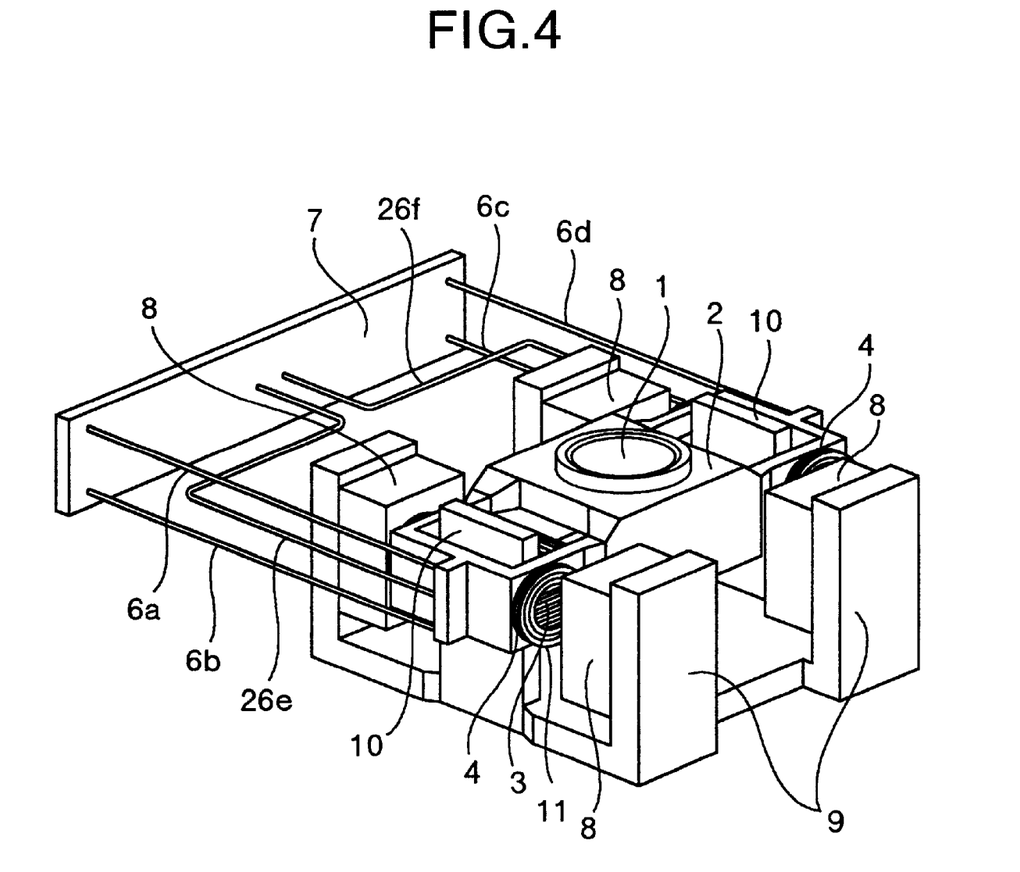
FIG. 4 is a view showing another embodiment of the present invention.

Next, FIG. 4 shows another embodiment of the present invention. The support members 26e and 26f shown in FIG. 4 comprise the support members 6e and 6f in the first embodiment which each have two bent portions in the middle thereof. These support members have one end fixed to the outer edge portions of the lens holder 2 and the other end fixed to the fixing section 7 inside the plane enclosed by the four support members 6a, 6b, 6c, and 6d fixed to the outer edge portions of the lens holder 2. The other part of the configuration is the same as that in the first embodiment and description thereof is thus omitted. When the bent portions are formed in the middle of each of the support members 26e and 26f as in this embodiment, the overall length thereof can be increased to reduce the spring constant of the support members 26e and 26f. Furthermore, since the fixing section 7 is supported in the center of the plane enclosed by the four support members 6a, 6b, 6c, and 6d, the operational sensitivity in the inclining direction is improved as in the first embodiment.

Figure 5:
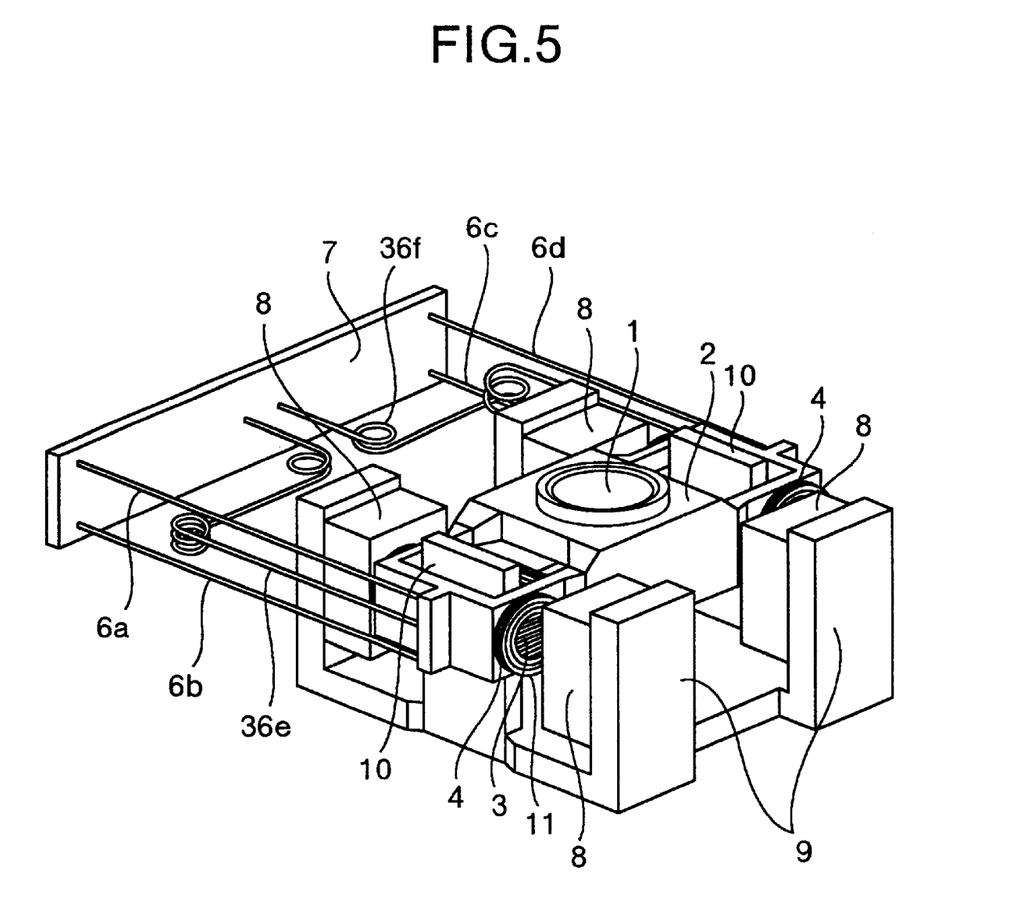
FIG. 5 is a view showing another embodiment of the present invention.

Next, another embodiment of the present invention is shown in FIG. 5. The support members 36e and 36f shown in FIG. 5 correspond to the support members 26e and 26f of the embodiment in FIG. 4 in which the two bent portions thereof are shaped like coils. The other part of the configuration is the same as that in FIG. 4 and description thereof is thus omitted. When the support members 36e and 36f each have the coil-shaped bent portions in the middle thereof as in this embodiment, the overall length thereof is increased to reduce the spring constant and the coil-shaped portions also serve to reduce the spring constant, thereby further improving the operational sensitivity in the inclining direction.

Figure 6:
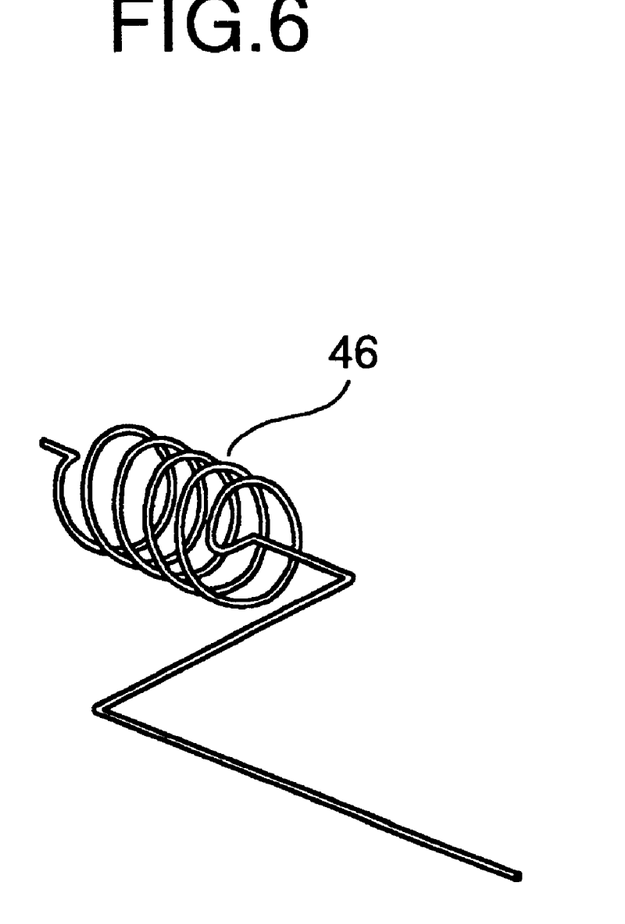
FIG. 6 is a view showing another embodiment of the present invention.

In addition, as shown in FIG. 6, a support member 46 having one end fixed to the outer edge portion of the lens holder 2 and the other end fixed to the fixing section 7 inside the four support members fixed to the outer edge portions of the lens holder 2 may be shaped by combining the configurations in FIGS. 3 and 4 together. Alternatively, although not shown, it may be shaped by combining the configurations in FIGS. 3 and 4 together. This is effective in further reducing the spring constant of the support member 46.

Figure 8:
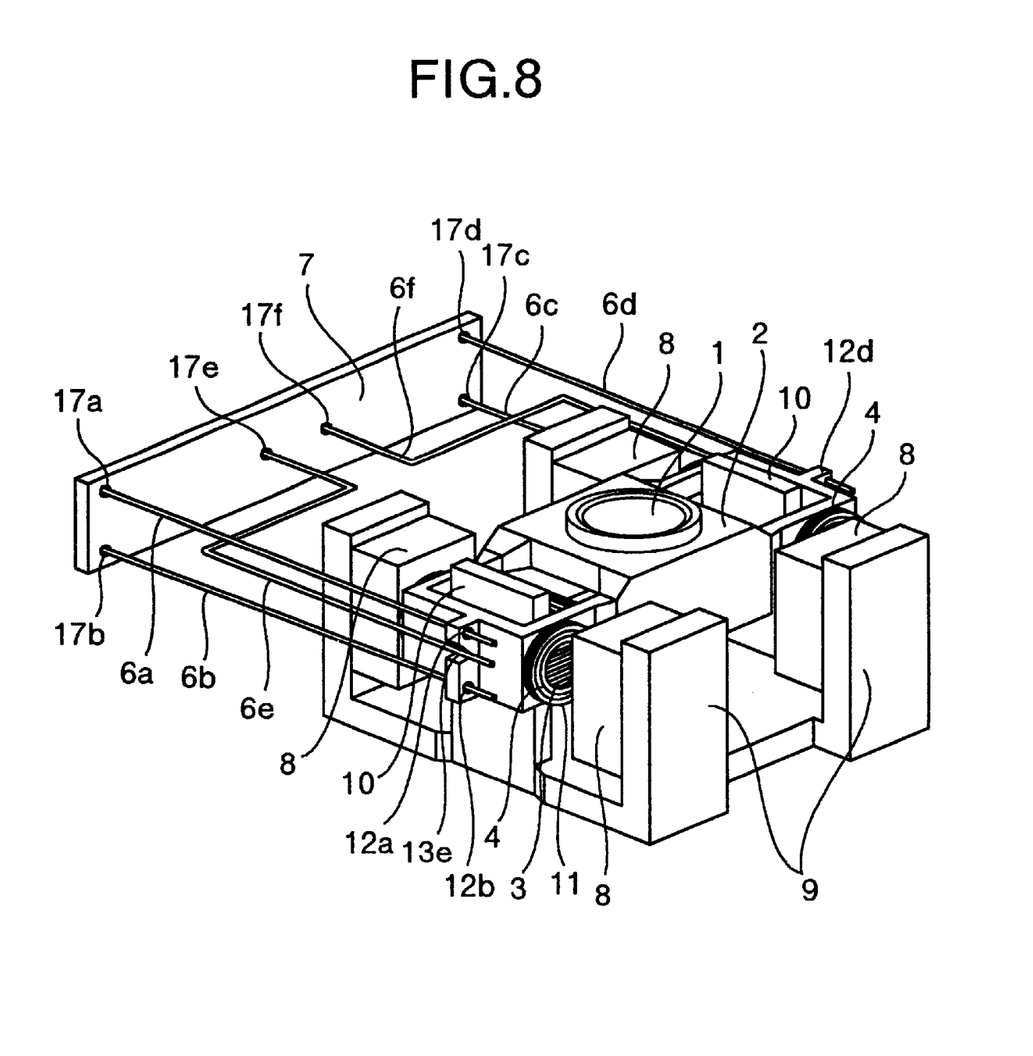
FIG. 8 is a view showing further another embodiment of the objective lens driving device of the present invention.

FIG. 8 is a perspective view showing an objective lens driving device according to another embodiment of the present invention. This drawing shows a configuration that is essentially the same as the embodiment in FIG. 4 except for the following two points that are introduced to allow the device to be assembled easily. As a first point, the length of the fixing section side of each of the support members 6a, 6b, 6c, 6d, 6e, and 6f is increased. As a second point, through-holes 12a, 12b, 12c, and 12d are formed in those portions of the fixing sections provided at the outer edge portions of the lens holder 2 in which the four support members 6a, 6b, 6c, and 6d, respectively, are fixed, and fixing sections for the two support members 6e and 6f for the inclining operation comprise grooves 13e and 13f. The fixing section 7 has through-holes 17a, 17b, 17c, 17d, 17e, and 17f formed therein.

Figure 9:
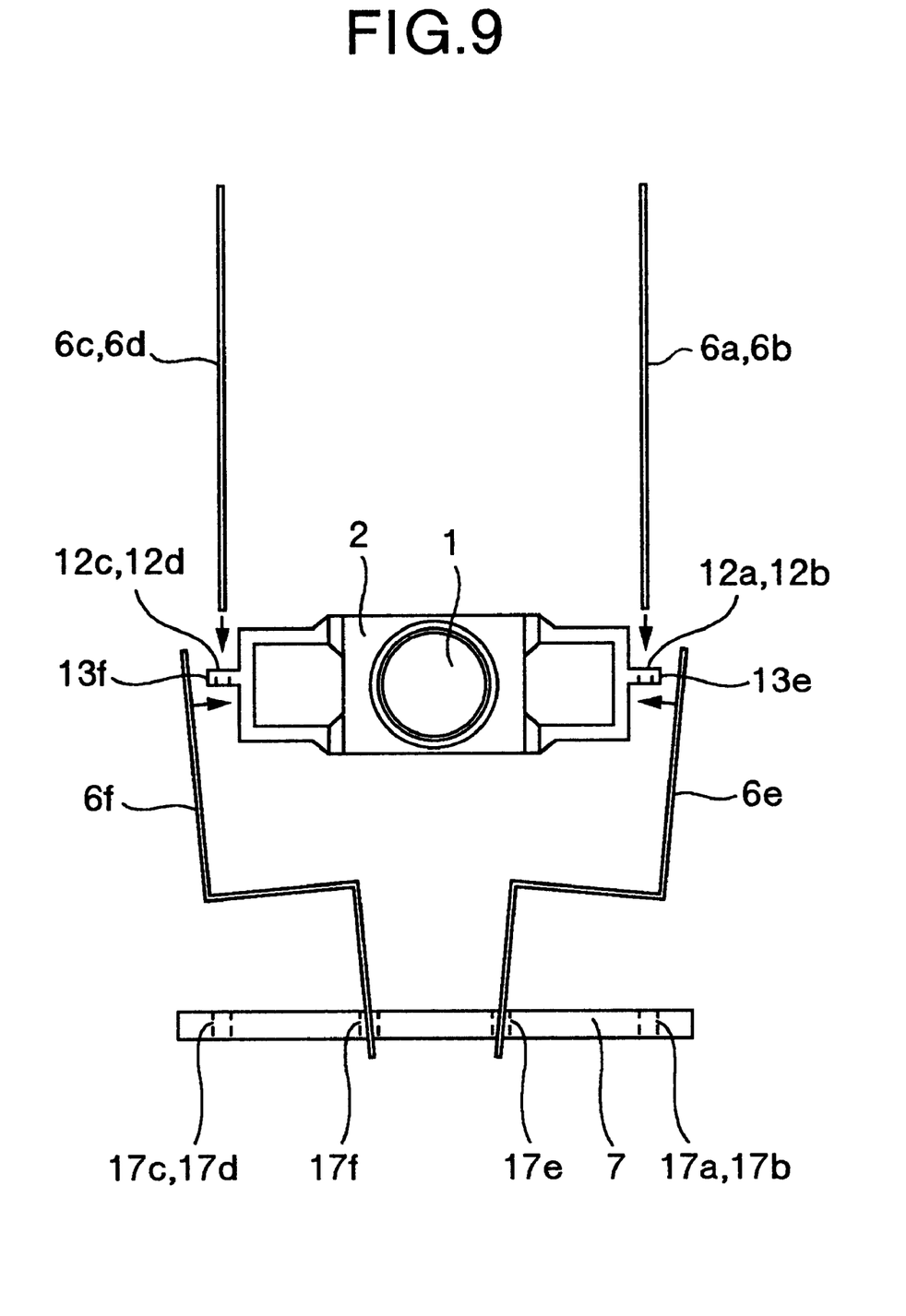
FIG. 9 is a view showing how support members in the embodiment in FIG. 8 are attached.

A method for assembling the above described structure will be described with reference to FIG. 9. The four linear support members 6a, 6b, 6c, and 6d are fixed to the lens holder 2 and the fixing section 7 by inserting them through the holes 12a, 12b, 12c, and 12d, respectively, formed in the outer edge portions of the lens holder 2 and then the holes 17a, 17b, 17c, and 17d, respectively, formed in the fixing section 7 and then applying adhesive or molten solder to appropriate positions. Here, the support members 6a, 6b, 6c, and 6d are inserted from the lens holder 2 side toward the fixing section 7 side, but they may of course be inserted from the fixing section 7 side toward the lens holder 2. The two support members 6e and 6f having the bent portions in the middle thereof are fixed to the lens holder 2 and the fixing section 7 by inserting them through the holes 17e and 17f, respectively, formed in the fixing section 7, positioning them along the grooves 13e and 13f, respectively, formed in the side surfaces of the lens holder 2, and then applying adhesive or molten solder to appropriate positions. Although not shown, the six support members 6a, 6b, 6c, 6d, 6e, and 6f are electrically connected to the focusing coils 3, tracking coils 4, and inclining-operation coils 11 by means of soldering.

When the two support members 6e and 6f each have the bent portions in the middle thereof as in this embodiment, the overall length of the support members 6e and 6f can be increased to reduce the spring constant. As described previously, the operational sensitivity in the inclining direction is inversely proportional to the spring constant of the support member, the bent portions formed in the middle of the support members 6e and 6f serve to improve the operational sensitivity in the inclining direction.

In addition, when an attempt is made to insert the support members 6e and 6f each having the bent portions in the middle thereof, into the corresponding holes both in the lens holder 2 and in the fixing section 7 for fixation, the support members 6e and 6f must be inserted deep into one of the lens holder 2 and the fixing section 7 and then bent appropriately so as to be fitted in the other. This operation is difficult. In contrast, in this embodiment, the support members 6e and 6f are fixed to the lens holder 2 by passing them along the grooves 13e and 13f, respectively, formed in the side surfaces of the lens holder 2, thereby eliminating the need to appropriately bend the support members to enable easy operations.

Figure 10:
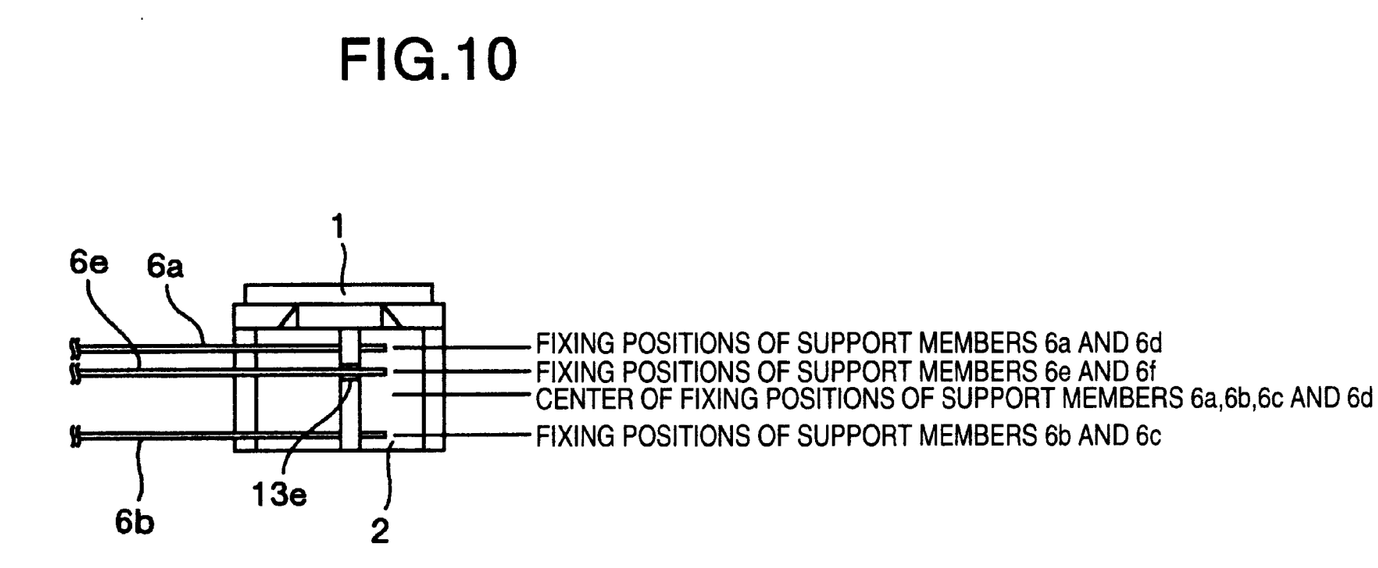
FIG. 10 is a view showing where the support members in the embodiment in FIG. 8 are attached.

Further, in this embodiment, the position where the two support members 6e and 6f are fixed along the grooves 13e and 13f, respectively, formed in the side surfaces of the lens holder 2 is closer to the objective lens 1 in the direction of the optical axis of the objective lens 1 than the center of the positions at which the four linear support members 6a, 6b, 6c, and 6d are fixed, as shown in FIG. 10. Thus, a support center determined by the balance of the rigidities of the six support members 6a, 6b, 6c, 6d, 6e, and 6f can be located closer to the objective lens 1. If the objective lens 1 is mounted at the top of the lens holder 2 as shown in FIG. 10, the center of gravity of the movable portion 5 is located closer to the objective lens 1 than the center of the fixing positions of the four support members 6a, 6b, 6c, and 6d. Thus, this embodiment enables the support center to be located closer to the center of gravity of the movable position 5, thereby providing an objective lens driving device that is both statically and dynamically balanced.

In the case when a balance weight or the like is attached to the bottom of the lens holder 2 to locate the center of gravity of the movable portion 5 opposite the objective lens 1 with respect to the center of the fixing positions of the four support members 6a, 6b, 6c, and 6d, then the fixing positions of the support members 6e and 6f may be located opposite the objective lens 1 with respect to the center of the fixing positions of the four support members 6a, 6b, 6c, and 6d in the direction of the optical axis of the objective lens 1. In either case, the fixing positions of the support members 6e and 6f may be located closer to the center of gravity of the movable portion 5 with respect to the center of the fixing positions of the four support members 6a, 6b, 6c, and 6d in the direction of the optical axis of the objective lens 1.

Furthermore, although not shown here, in the configuration of the embodiment in FIG. 5, the same assembly method as that shown in FIG. 8 can be used by increasing the length of each support member and structuring the fixing section in the same manner as in FIG. 8.

As described above, according to the present invention, the four support members fixed to the outer edge portions of the lens holder serve to restrain cross action, which may occur during an operation in each direction, and the support members disposed for the inclining operation are fixed inside the four support members fixed to the outer edge portions of the lens holder or have the coil-shaped portion or the bent portions in the middle thereof, thereby improving the operational sensitivity in the inclining direction. Consequently, the objective lens driving device and the optical disk apparatus can be stably driven and controlled. The support members can be assembled more easily by fixing two support members having the coil-shaped portion or the bent portions in the middle thereof in such a manner as to extend along the grooves formed in the side surfaces of the lens holder.

What is claimed is:

1. An objective lens driving device comprising:
   an objective lens for converging light on a recording surface of an optical disk;
   a lens holder for holding said objective lens; and
   five or more support members for supporting a movable portion including said lens holder in such a manner that the movable portion can operate relative to a fixing section in a focusing direction, a tracking direction, and an inclining direction of an optical axis of said objective lens,
   wherein four of said support members are fixed to outer edge portions of said lens holder, and the other support members are arranged near a center of a plane surrounded by the four support members fixed to the outer edge portions of said lens holder.

2. The objective lens driving device according to claim 1, wherein said other support members have a coil-shaped portion in a middle portion thereof or all over a length thereof.

3. The objective lens driving device according to claim 1, wherein the four support members fixed to the outer edge portions of said lens holder have one end thereof fixed to the outer edge portions of sides of said lens holder and another end thereof fixed to said fixing section.

4. The objective lens driving device according to claim 1, wherein the four support members extend in a same direction from the outer edge portions of said lens holder to said fixing section substantially in parallel with one another.

5. The objective lens driving device according to claim 1, further comprising focusing coils, tracking coils and inclining direction coils with the other support members being provided for the inclining direction operation of the inclining direction coils and being disposed inside of the four support members fixed to the outer edge portions of said lens holder.

6. The objective lens driving device comprising:
   an objective lens for converging light on a recording surface of an optical disk;
   a lens holder for holding said objective lens; and
   five or more support members for supporting a movable portion including said lens holder in such a manner that the movable portion can operate relative to a fixing section in a focusing diretion, a tracking direction, and an inclining direction of an optical axis of said objective lens,
   wherein four of said support members are fixed to outer edge portions of said lens holder, and the other support members are arranged near a center of a plane surrounded by the four support members fixed to the outer edge portions of said lens holder, and
   wherein said other support members have two or more bent portions in a middle portion thereof.

7. The objective lens driving device according to claim 6, wherein the bent portions of said other support members are shaped like coils.

8. An optical disk apparatus comprising:
   an opening through which an optical disk that is a portable recording medium is moved in and out;
   a mechanism for fixing the optical disk inserted through said opening, on a driving shaft of a motor; and
   an optical head for at least reading information from said optical disk when said motor is rotated,
   wherein said optical head comprises:
      a lens holder for holding an objective lens; and
      five or more support members for supporting a movable portion including said lens holder in such a manner that the movable portion can operate relative to a fixing section in a focusing direction, a tracking direction, and an inclining direction of an optical axis of said objective lens,
      and four of said support members can be operated in the focusing direction and the tracking direction, and the other support members are arranged so as to operate in the inclining direction.

9. The optical disk apparatus according to claim 8, wherein said optical head further comprising focusing coils, tracking coils and including direction coils, said other support members being arranged for at least said inclining direction coils.

10. The optical disk apparatus according to claim 8, wherein the four of said support members extend from outer edge portions of sides of said lens holder in a direction substantially parallel to one another and said other support members being disposed between said parallel arranged for support members.

11. The optical disk apparatus comprising:

an opening through which an optical disk that is a portable recording medium is moved in and out;

a mechanism for fixing the optical disk inserted through said opening, on a driving shaft of a motor; and an optical head for at least reading information from said optical disk when said motor is rotated, wherein said optical head comprises:

a lens holder for holding an objective lens; and five or more support members for supporting a movable portion including said lens holder in such a manner that the movable portion can operate relative to a fixing section in a focusing direction, a tracking direction, and an inclining direction of an optical axis of said objective lens, and four of said support members can be operated in the focusing direction and the tracking direction, and the other support members are arranged so as to operate in the inclining direction, wherein said support members that can operate in the inclining direction have two or more bent portions in a middle portion thereof.

12. The optical disk apparatus according to claim 11, wherein the bent portions formed in the middle portions of said support members that can operate in the inclining direction are shaped like coils.

13. An objective lens driving device comprising: an objective lens for converging light on a recording surface of an optical disk; a lens holder for holding said objective lens; four linear support members for supporting a movable portion including said lens holder in such a manner that the movable portion can operate relative to a fixing section in a focusing direction, a tracking direction, and an inclining direction of an optical axis of said objective lens; and two support members having a coil-shaped portion or bent portions in a middle thereof, wherein in said lens holder there are provided through-holes for fixing said four linear support members therein and grooves for fixing said two support members therein which have the coil-shaped portion or bent portions in the middle thereof.

14. The objective lens driving device according to claim 13, wherein positions where said two support members are fixed in said grooves in said lens holder are closer to said objective lens than a center of fixing positions of said four linear support members in the direction of the optical axis of said objective lens.

15. The objective lens driving device according to claim 13, wherein positions where said two support members are fixed in said grooves in said lens holder are closer to a center of gravity of said movable portion than a center of fixing positions of said four linear support members in the direction of the optical axis of said objective lens.

* * * * *